United States Patent
Hasbe et al.

(10) Patent No.: US 10,684,788 B1
(45) Date of Patent: Jun. 16, 2020

(54) DATA CONSISTENCY DURING REVERSE REPLICATION

(71) Applicant: Veritas Technologies LLC, Mountain View, CA (US)

(72) Inventors: Sunil Hasbe, Shirur Anantpal (IN); Rushikesh Patil, Pune (IN)

(73) Assignee: Veritas Technologies, LLC, Santa Clara, CA (US)

( * ) Notice: Subject to any disclaimer, the term of this patent is extended or adjusted under 35 U.S.C. 154(b) by 154 days.

(21) Appl. No.: 15/844,092

(22) Filed: Dec. 15, 2017

(51) Int. Cl.
*G06F 11/00* (2006.01)
*G06F 3/06* (2006.01)
*G06F 11/14* (2006.01)

(52) U.S. Cl.
CPC ............ *G06F 3/0647* (2013.01); *G06F 3/067* (2013.01); *G06F 3/0619* (2013.01); *G06F 11/1464* (2013.01); *G06F 11/1469* (2013.01); *G06F 2201/805* (2013.01); *G06F 2201/82* (2013.01)

(58) Field of Classification Search
CPC .......................... G06F 11/1402; G06F 11/1469
USPC .......................................................... 714/19
See application file for complete search history.

(56) References Cited

U.S. PATENT DOCUMENTS

| | | | |
|---|---|---|---|
| 8,291,101 B1 * | 10/2012 | Yan | H04L 67/1095 709/230 |
| 10,379,919 B2 * | 8/2019 | Mu | |
| 2010/0070800 A1 * | 3/2010 | Hanna | G06F 21/575 714/6.12 |
| 2016/0110127 A1 * | 4/2016 | Qiao | G06F 3/0619 711/162 |
| 2017/0091219 A1 * | 3/2017 | Seinfeld | G06F 21/568 |
| 2017/0154093 A1 * | 6/2017 | Shetty | G06F 3/065 |
| 2017/0316029 A1 * | 11/2017 | Shah | G06F 3/0665 |

* cited by examiner

*Primary Examiner* — Sarai E Butler
(74) *Attorney, Agent, or Firm* — Campbell Stephenson LLP

(57) ABSTRACT

Disclosed herein are methods, systems, and processes to provide and maintain data consistency during reverse replication. It is determined that a migrate operation or a reverse replication operation has been requested. Upon determining that the migrate operation or the reverse replication operation has been requested, a resynchronization identifier is set in a dirty region log (DRL) associated with a computing device that is subject to the migrate operation or the reverse replication operation. In response to the operation being the reverse replication operation, a master boot record (MBR) sector of a boot disk associated with the computing device is overwritten.

20 Claims, 9 Drawing Sheets

DATA CONSISTENCY DURING REVERSE REPLICATION

FIELD OF THE DISCLOSURE

This disclosure relates to data replication in disaster recovery as a service (DRaaS) computing environments. In particular, this disclosure relates to providing and maintaining data consistency during reverse replication in such DRaaS computing environments.

DESCRIPTION OF THE RELATED ART

Data replication involves making duplicate copies of data and improves reliability, fault-tolerance, and/or accessibility. The purpose of data replication is to prevent data loss if failures or disasters occur in one location. If such failures or disasters do occur and destroy or damage a copy of the data in one location, the copy of the data at a secondary site can be accessed. For these purposes, among others, replicated data can also be stored and/or maintained in remote cloud-based storage devices (e.g., as part of disaster recovery as a service (DRaaS), among other such services).

Reverse replication involves transferring data back to premises after a premise-based computing device has been recovered, for example, after a disaster or maintenance. When a premise-based computing device is shut down for maintenance or becomes unavailable due to a disaster, a recovered virtual machine is instantiated in the cloud to service clients for migration and takeover, respectively, and traffic is re-directed to that virtual machine. When the premise-based computing device is recovered and becomes operational, reverse replication permits changes made during downtime to be replicated back on premise.

Unfortunately, (reverse) replicating data from a virtual machine in the cloud back to a physical machine on premises can result in data corruption because of inconsistencies between copies of data maintained in the cloud and on premises.

SUMMARY OF THE DISCLOSURE

Disclosed herein are methods, systems, and processes to provide and maintain data consistency during reverse replication, for example, in DRaaS computing environments. One such method involves determining that an operation has been requested, where the operation is a migrate operation or a reverse replication operation. Upon determining that the migrate operation or the reverse replication operation has been requested, the method sets a resynchronization identifier in a dirty region log (DRL) associated with a computing device that is subject to the migrate operation or the reverse replication operation. In response to the operation being the reverse replication operation, the method overwrites a master boot record (MBR) sector of a boot disk associated with the computing device.

In one embodiment, the method determines that a failback operation has been requested, and upon determining that the failback operation requested, resets the resynchronization flag on the DRL and restores the MBR sector on the boot disk. In this example, the computing device subject to the operation is a physical computing device or a virtual machine that does not have access to a hypervisor.

In some embodiments, setting the resynchronization identifier permits a filter driver executing on the computing device to identify whether the computing device is booting up while a resynchronization operation is ongoing, and if the resynchronization operation is ongoing, the filter driver blocks input/output (I/O) operations executed by applications executing on the computing device and resets an operating system (OS) of the computing device.

In other embodiments, overwriting the MBR sector inhibits the computing device from booting using a boot volume even if the computing device can be booted using an operating system (OS) provided by a preboot execution environment (PXE) server. In these examples, setting the resynchronization identifier and the overwriting the MBR sector is performed by a premise data mover, the premise data mover is communicatively coupled to the computing device, and the premise data mover is communicatively coupled to a cloud data mover via a network.

In certain embodiments, and as part of the reverse replication operation, the method writes replicated data received from the cloud data mover to a storage device that includes protected disks associated with the computing device.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
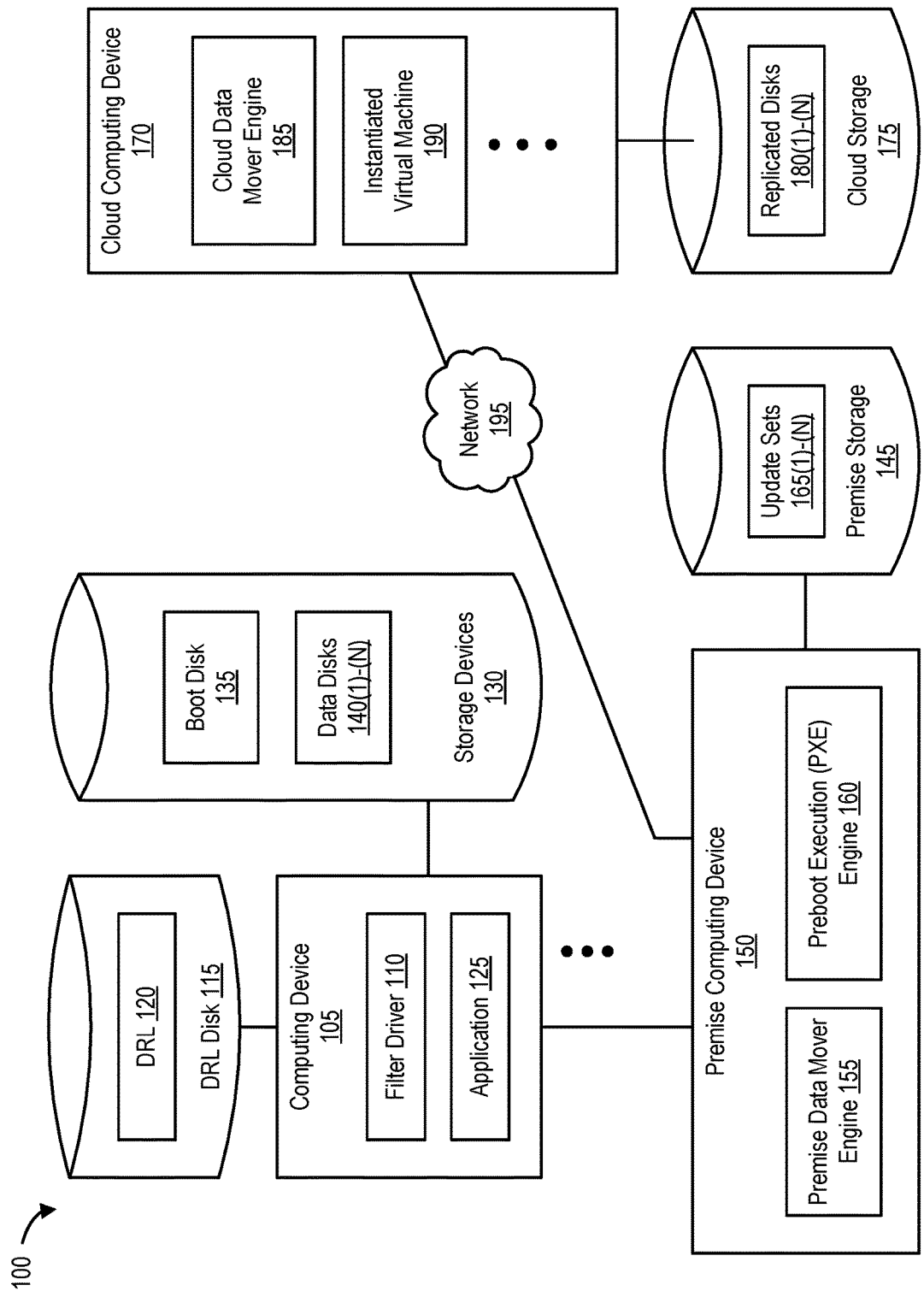
FIG. 1 is a block diagram 100 of a computing system for data consistency during reverse replication, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Reverse replication involves transferring data back to premises after a premise-based computing device has been recovered, for example, after recovery from a disaster or maintenance being performed. When a premise-based computing device is shut down for maintenance or becomes unavailable due to a disaster, a recovered virtual machine is instantiated in the cloud to service clients for migration and takeover, respectively, and traffic is re-directed to that virtual machine. When the premise-based computing device is recovered and becomes operational, reverse replication permits changes made during downtime to be replicated back on premise (e.g., from the cloud).

For reverse replication to be performed, data has to be first replicated from premises to the cloud as part of forward replication. Computing devices such as physical machines and/or virtual machines typically include at least one boot disk (e.g., to store operating system (OS) data) and one or more data disks (e.g., to store application data) that require protection as part of the replication process (e.g., replication to the cloud). A kernel level driver (e.g., a volume filter driver) can be used to monitor and tap input/output (I/O) operations, sending those I/Os to a primary/on-premise data mover (e.g., a premise computing device). The on-premise data mover can then transmit the I/Os to a cloud data mover (e.g., a cloud computing device) which applies those I/Os to a target disk as part of an update set.

Migration involves shutting down a virtual computing device (e.g., a virtual machine) on premises and instantiating a corresponding virtual machine in the cloud to act as its replacement. Because migration permits graceful shutdown of a physical machine or a virtual machine on premises, I/Os tapped until the point of shutdown are replicated to the cloud ensuring data consistency between data in the cloud and on premises. On the other hand, takeover involves the unexpected shutdown or loss of a physical machine or a virtual machine on premises. Therefore, because of the abrupt nature of the failover, data served by a virtual machine instantiated in the cloud as a result of takeover can be consistent or inconsistent. Consequently, a failback operation following a takeover typically requires full synchronization between data in the cloud and on premises as opposed to simply partially synchronizing changed data, which is possible with migration.

If the computing device on premises is a virtual machine with hypervisor support, failback is fairly straightforward and involves having the hypervisor detach virtual disks on the cloud and reattach those virtual disks to the on-premise data mover. Unfortunately, if the computing device on premises is a physical machine or a virtual machine with no hypervisor access, reverse replication and failback operations pose unique challenges. For example, a virtual disk in the cloud cannot be easily detached and re-attached as a physical disk on premises with write capability. These challenges are now discussed.

While performing reverse replication between virtual assets in the cloud and physical assets on premises (or virtual assets on premises with no access to hypervisor support), a preboot execution environment (PXE) protocol can be used to bring up an OS on a physical host for the purpose of exporting boot and data disks (e.g., over a network). The on-premise data mover can then be used to connect to and write data to these (exported) boot and data disks. However, if the (target) physical host reboots during reverse replication or boots up using a boot volume instead of a PXE (custom) image (e.g., because of network problems or PxE image transfer failure), a half-cooked replicated (boot) disk can experience data corruption and can also corrupt one or more data disks (e.g., by inadvertently writing inconsistent application data to these disks).

As previously noted, a guest filter driver taps I/Os on a physical host or a virtual host with no hypervisor access and sends those I/Os over a network (e.g., a Local Area Network (LAN)) to a premise data mover. The premise data mover maintains the received I/Os in the form of update sets (e.g., a set of changed data blocks over a period of time) and asynchronously transmits the I/Os to a cloud data mover (e.g., over a Wide Area Network (WAN)). If a migrate operation is invoked, the protected host on premises is brought down gracefully and an instance (e.g., an instantiated virtual machine) is created in the cloud using replicated target disks. Reverse replication works like a migrate operation, but in the reverse direction given that the premise data mover can write to disk(s) of the protected host. For virtual machines with hypervisors, virtual machine disk files (e.g., .vmdk/.vdk) can be directly attached to the premise data mover. Unfortunately, as noted above, doing the same for physical machines or virtual machines with no hypervisor access poses unique challenges.

Performing reverse replication for physical machines or virtual machines without hypervisor access involves bringing up the protected host using an OS which exports boot and data disks over a network. The premise data mover then connects to these exported boot and data disks and writes update sets to these exported boot and data disks. For example, a custom PXE server that serves as a live OS to protected hosts (e.g., physical machines and/or virtual machines with no hypervisor access) can be hosted on the premise data mover for this purpose. The foregoing process relies on the disks exported by the live OS.

Unfortunately, if the protected host reboots while reverse replication is ongoing (e.g., because of a power failure, and the like), the protected host may not be able to boot into the live OS because of several reasons. For example, the PXE server may not receive a PXE request to serve, the PXE image transfer may fail due to a bad network connection (e.g., trivial file transfer protocol (TFTP) abortion), the premise data mover may go down or become unavailable (taking the PXE server down with it), or another PXE server present in the (same) subnet can cause race conditions (and hence PXE boot failure).

Therefore, given the foregoing factors and/or potential complications, the protected host should not, cannot, or might not boot into a live OS. Instead, the protected host will move to the next choice in the boot sequence and try to boot itself using the boot volume. Because the boot volume is undergoing replication as part of reverse replication, the protected host will boot up into an inconsistent state of the boot volume (which may write to the boot volume). Further, if an application begins execution during the boot sequence, data disks can also experience data corruption. In such cases, full synchronization between data in the cloud and on premises is required, which is needless to say, computing and human resource intensive. In addition, the risk of data corruption caused by the foregoing factors and/or potential complications renders data inconsistent in DRaaS computing environments where reverse replication is required.

Disclosed herein are methods, systems, and processes to provide and maintain data consistency between cloud and on premise data while performing reverse replication for physical machines and virtual machines without hypervisor access in DRaaS computing environments.

Example Computing System for Data Consistency During Reverse Replication

FIG. 1 is a block diagram 100 of a computing system for data consistency during reverse replication, according to one embodiment. As shown in FIG. 1, computing device 105 includes a filter driver 110 and executes application 125. Computing device 105 is communicatively coupled to or includes a dirty region logging (DRL) disk 115, which further includes a dirty region log (DRL) 120. Computing device 105 is also communicatively coupled to storage devices 130. Storage devices 130, which can be part of computing device 105 or separate, store at least a boot disk 135 and one or more data disks 140(1)-(N) associated with computing device 105. In one embodiment, boot disk 135 stores operating system (OS) data associated with computing device 105 and data disks 140(1)-(N) store application data generated by application 125.

In some embodiments, filter driver 110 is a kernel-level driver, a guest filter driver, a volume filter driver, or any similar mechanism that is capable of monitoring, tapping, and/or recording input/output (I/O) operations generated by application 125. In other embodiments, DRL 120 is a bitmap maintained by filter driver 110 for tracking changed data (e.g., deltas). Filter driver 110 and/or DRL 120 can be implemented, stored, and/or maintained in the memory of computing device 105. In certain embodiments, computing device 105 is a physical computing device or a virtual machine with no hypervisor access.

Computing device 105 is also communicatively coupled to a premise computing device 150, for example, via a local area network (LAN). Premise computing device 150, which is a premise data mover, implements at least a premise data mover engine 155 and a preboot execution (PXE) engine 160, and is communicatively coupled to a premise storage 145. Premise storage 145 maintains and stores one or more update sets 165(1)-(N). Premise computing device 150 is also communicatively coupled to a cloud computing device 170 (e.g., a cloud data mover), via network 195. Cloud computing device 170 implements at least a cloud data mover engine 185 and an instantiated virtual machine 190. Cloud computing device 170 is communicatively coupled to a cloud storage 175 which maintains replicated disks 180(1)-(N) (which contain data replicated to cloud computing device 170 from premise computing device 150).

Computing device 105, premise computing device 150, and/or cloud computing device 170 can be any of a variety of different computing devices, including a server, personal computing device, laptop computer, cellular phone, or the like. Network 195 can be any type of network and/or interconnection (e.g., the Internet, a Wide Area Network (WAN), and the like). Storage devices 130, premise storage 145, and/or cloud storage 175 can include one or more of a variety of different storage devices, including hard disks, compact discs, digital versatile discs, solid state drive (SSD) using "Flash" memory, and the like, or one or more logical storage devices such as volumes implemented on one or more such physical storage devices.

In one embodiment, to perform a failback operation (e.g., virtual to physical), a Dynamic Host Configuration Protocol (DHCP)/Preboot Execution Environment (PXE) server is hosted on premise computing device 150 (e.g., premise data mover). Computing device 105 then boots into PXE mode (e.g., as the result of an administrator or wake up on LAN). An OS (e.g., a minimal version of an OS such as centOS) loads scripts to connect to premise computing device 150 and exchanges replication configuration information between premise computing device 150 and computing device 105. Computing device 105 then exports at least one boot disk (e.g., boot disk 135) and one or more data disks (e.g., data disks 140(1)-(N)) (e.g., over Internet Small Computer Systems Interface (iSCSI)) to the premise data mover, where the data is replicated. Once the disks are visible, premise data mover resumes replication. Therefore, configuring computing device 105 to boot in PXE mode involves at least selecting a boot sequence, configuring DHCP/PXE, addressing the issue of multiple PXE servers in the same subnet, and addressing network issues (e.g., setting up relays across subnets).

Unfortunately, booting a physical machine or a virtual machine without access to hypervisor support in normal boot order leads to boot disk corruption and as well the risk of data disk corruption (e.g., if an application is brought up during the boot process). Unless an administrator proactively monitors the boot environment, there is no way to detect such data corruption and a full synchronization between cloud and on premise data is required to address data inconsistency. However, the physical machine or the virtual machine without access to hypervisor support cannot be prevented from performing the boot order sequence while full synchronization is ongoing.

Example Premise Data Mover for Data Consistency

Figure 2:
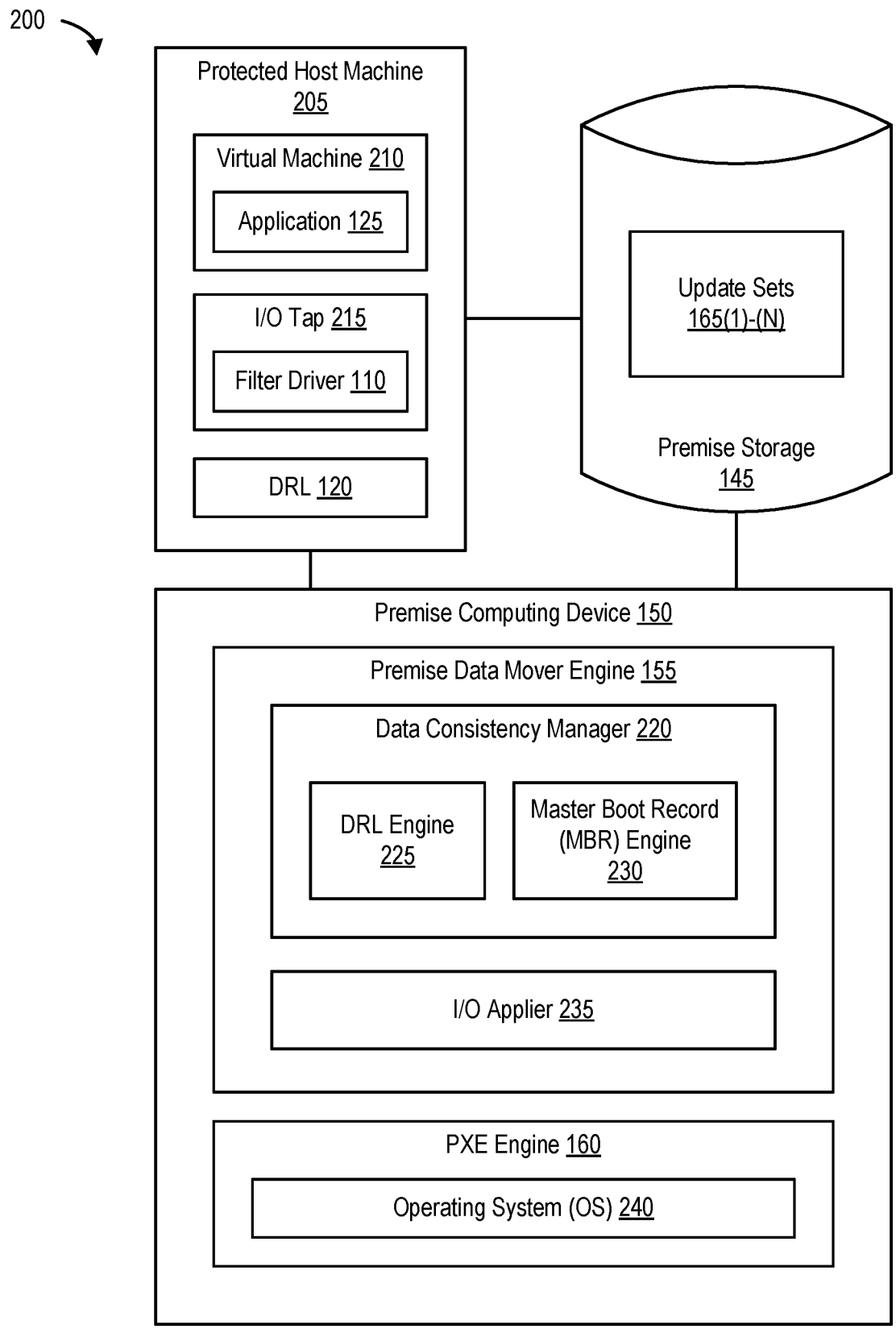
FIG. 2 is a block diagram 200 of an on premise data mover that performs virtual machine to physical machine (reverse) replication, according to one embodiment of the present disclosure.

FIG. 2 is a block diagram 200 of an on premise data mover that performs virtual machine to physical machine (reverse) replication, according to one embodiment. As shown in FIG. 2, a protected host machine 205 (e.g., computing device 105) implements a virtual machine 210 which further executes application 125. Protected host machine 205 includes an I/O tap 215. I/O tap 215 implements filter driver 110 and maintains DRL 120 (e.g., a bitmap, and the like).

Premise computing device 150, which is a premise data mover, includes premise data mover engine 155 and PXE engine 160. Premise data mover engine 155 implements at least a data consistency manager 220 and an I/O applier 235 (e.g., for reverse replication purposes). Data consistency manager 220 further includes at least a DRL engine 225 and a master boot record (MBR) engine 230. PXE engine 160 includes an OS 240 (e.g., a custom PxE image) and establishes a client-server environment that boots a software assembly retrieved from a network on a PXE-enabled client (e.g., using DHCP and TFTP). Therefore, PXE engine 160 enables operating system booting, installation, and deployment.

In one embodiment, if a migration operation is requested, DRL engine 225 marks (or sets) a resynchronization bit (e.g., a flag, a marker, an identifier, and the like) in DRL 120 (of DRL disk 115). During reverse replication, if protected host machine 205 boots into normal boot order, filter driver 110 resets the operating system of protected host machine 205 (e.g., OS 240 provided as part of a custom PxE image, and the like). I/O tap 215 thus prevents or inhibits write operations to one or more target disks of protected host 205 (e.g., boot and data disks exported to the premise data mover as part of the PXE process).

However, if a takeover operation is requested instead of the migration operation, thus necessitating and/or requiring a full synchronization upon and/or during failback, data corruption can occur if the OS reboots to an inconsistent boot disk during full synchronization or while full synchronization is ongoing (e.g., due to power failure, and the like).

Therefore, in certain embodiments, MBR engine 230 overwrites the MBR sector on boot disk 135 (e.g., an iSCSI connected boot disk) (e.g., corrupts, deletes, nullifies, or otherwise puts the MBR sector in an unusable state) the first time the operating system is loaded on protected host machine 205. Now if a power failure, and the like, occurs (e.g., while full synchronization is ongoing, among other reasons), the Basic Input/Output System (BIOS) of protected host machine 205 will not find a boot disk (e.g., the exported and iSCSI connected boot disk).

In another embodiment, and if a failback operation is invoked and/or requested, DRL engine 225 resets the resynchronization bit in DRL 120 and MBR engine 230 restores the MBR sector of the (connected) boot disk, thus permitting forward replication to resume.

Example Computing System for Virtual to Physical Reverse Replication

Figure 3:
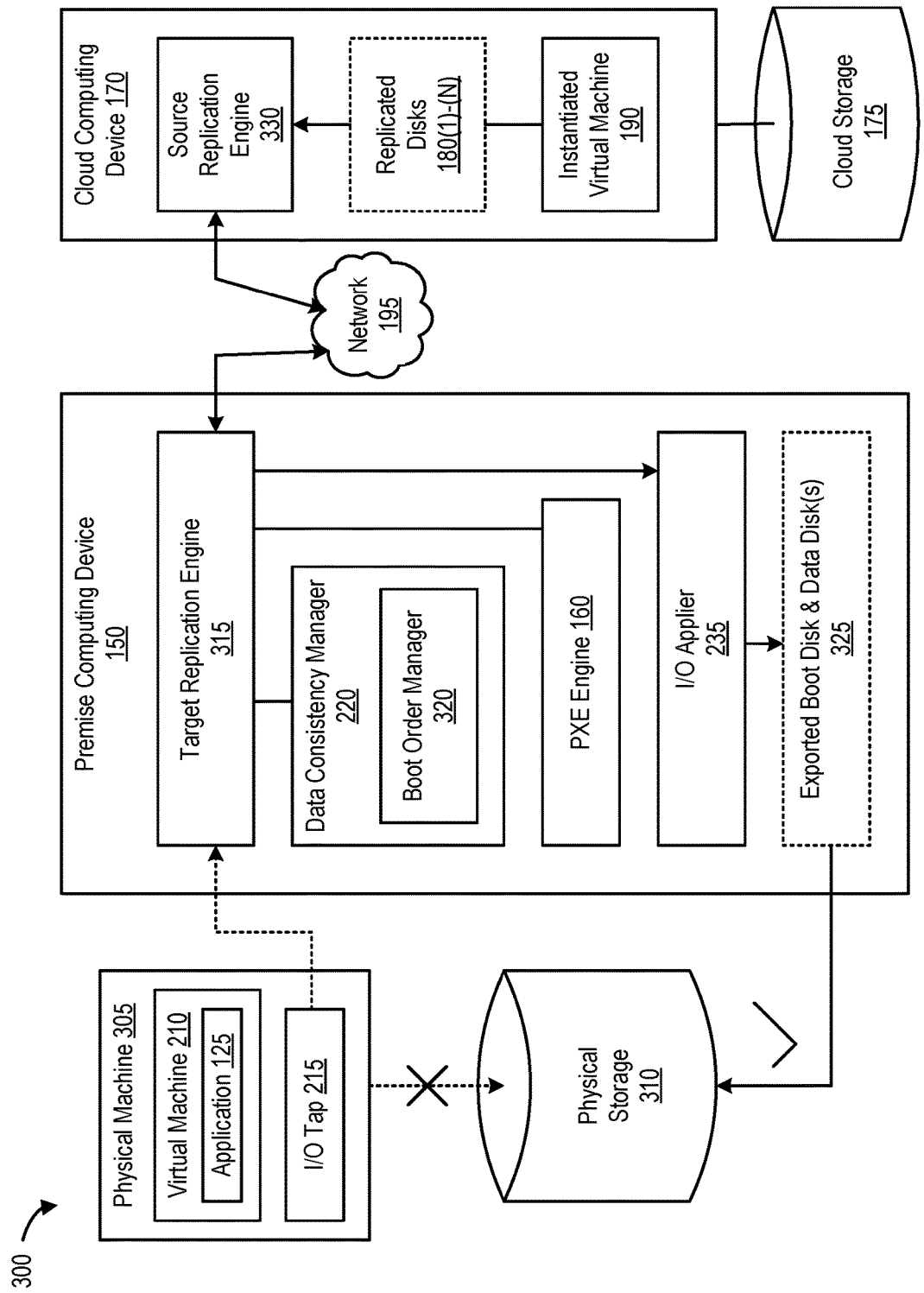
FIG. 3 is a block diagram 300 of an on premise data mover that writes replicated data to physical storage as part of virtual to physical machine (reverse) replication in a DRaaS computing environment, according to one embodiment of the present disclosure.

FIG. 3 is a block diagram 300 of an on premise data mover that writes replicated data to physical storage as part of virtual to physical machine (reverse) replication in a DRaaS computing environment, according to one embodiment. The computing system of FIG. 3 includes a physical machine 305. Physical machine 305 implements virtual machine 210 (which executes application 125) and includes I/O tap 215.

Premise computing 150 includes at least a target replication engine 315 (e.g., for performing reverse replication operations and failback operations), data consistency manager 220 (which includes a boot order manager 320 (e.g., to enable an administrator to manage and/or change a boot order sequence)), PXE engine 160, I/O applier 235 (e.g., to enable the premise data mover to write data to physical disk(s)), and exported boot and data disk(s) 325. Both premise computing device 150 and physical machine 305 are communicatively coupled to physical storage 310. Premise computing 150 is communicatively coupled to cloud computing device 170 (e.g., a cloud data mover) which includes a source replication engine 330 (e.g., for managing reverse replication and failback requests from the premise data mover), replicated disks 180(1)-(N) (with replicated data), and instantiated virtual machine 190 (e.g., for virtual to physical reverse replication), and is coupled to cloud storage 175.

In one embodiment, target replication engine 315 determines that an operation has been requested (e.g., by an administrator of the premise data mover). In this example, the operation is a migration operation or a reverse replication operation. Upon determining that a migration operation or a reverse replication operation associated with physical machine 305 has been requested, data consistency manager 220 sets a resynchronization identifier (e.g., a marker, a flag, an identifier, and the like) in DRL 120 (e.g., in the first 1024 bytes and/or in the bitmap) using DRL engine 225. If the operation being requested is a reverse replication operation, data consistent manager 220 overwrites the MBR sector of a boot disk associated with physical machine 305 using MBR engine 230.

In another embodiment, if the reverse replication operation is executed and/or performed, physical machine 305 boots using a normal boot sequence/order and filter driver 110 comes up first and checks whether the resynchronization flag is set in DRL 120 on DRL disk 115. Because the resynchronization flag is set by DRL engine 225, data consistency manager 220, in conjunction with PXE engine 160, resets the operating system of physical machine 305 (e.g., by issuing a shutdown and/or restart command) Therefore, physical machine 305 is prevented and/or inhibited from booting into the boot disk (thus, avoiding data corruption). To wit, the operating system is prevented from writing I/Os to the boot disk and the application is prevented from writing I/Os to data disk(s), and thus, data corruption is avoided during the reverse replication process.

In some embodiments, setting the resynchronization identifier permits filter driver 110 (e.g., implemented by I/O tap 215) executing on physical machine 305 to identify whether physical machine 305 is booting up while a resynchronization operation is ongoing, and if the resynchronization operation is ongoing, filter driver 110 blocks I/O operations executed by application 125 executing on physical machine 305 and resets the operating system of physical machine 305. It should be noted that the resynchronization flag can be set by DRL engine 225 (e.g., by orchestration) prior to invoking a graceful shutdown of physical machine 305 as part of the migrate operation. In this manner, data consistency manager 220 avoids full resynchronization if physical machine 305 boots up during reverse replication (e.g., for migration operations, but not takeover operations).

In certain embodiments, overwriting the MBR sector of the connected boot disk inhibits or prevents physical machine 305 from using a boot volume even if physical machine 305 can be booted using an operating system provided by PXE engine 160. In this example, information in the MBR sector (e.g., 512 bytes) is first copied (and saved) by the premise data mover so that the MBR sector can be restored at a later time.

In one embodiment, data consistency engine 220 determines that a failback operation has been requested, and upon determining that the failback operation has been requested, resets the resynchronization flag using DRL engine 225 and restores the MBR sector on the boot disk using MBR engine 230. In this example, after the resetting and the restoration, I/O applier 235 writes replicated data received from the cloud data mover to physical storage 310 that includes protected disks associated with physical machine 305.

In this manner, data consistency engine 220 prevents data corruption during reverse replication between virtual machines and physical machines, prevents the need for full synchronization (e.g., for migration operations), provides data integrity without needing to monitor the PXE computing environment, and works with virtual machines without access to hypervisor support (e.g., tenant customers).

Example Processes for Data Consistency During Reverse Replication

Figure 4:
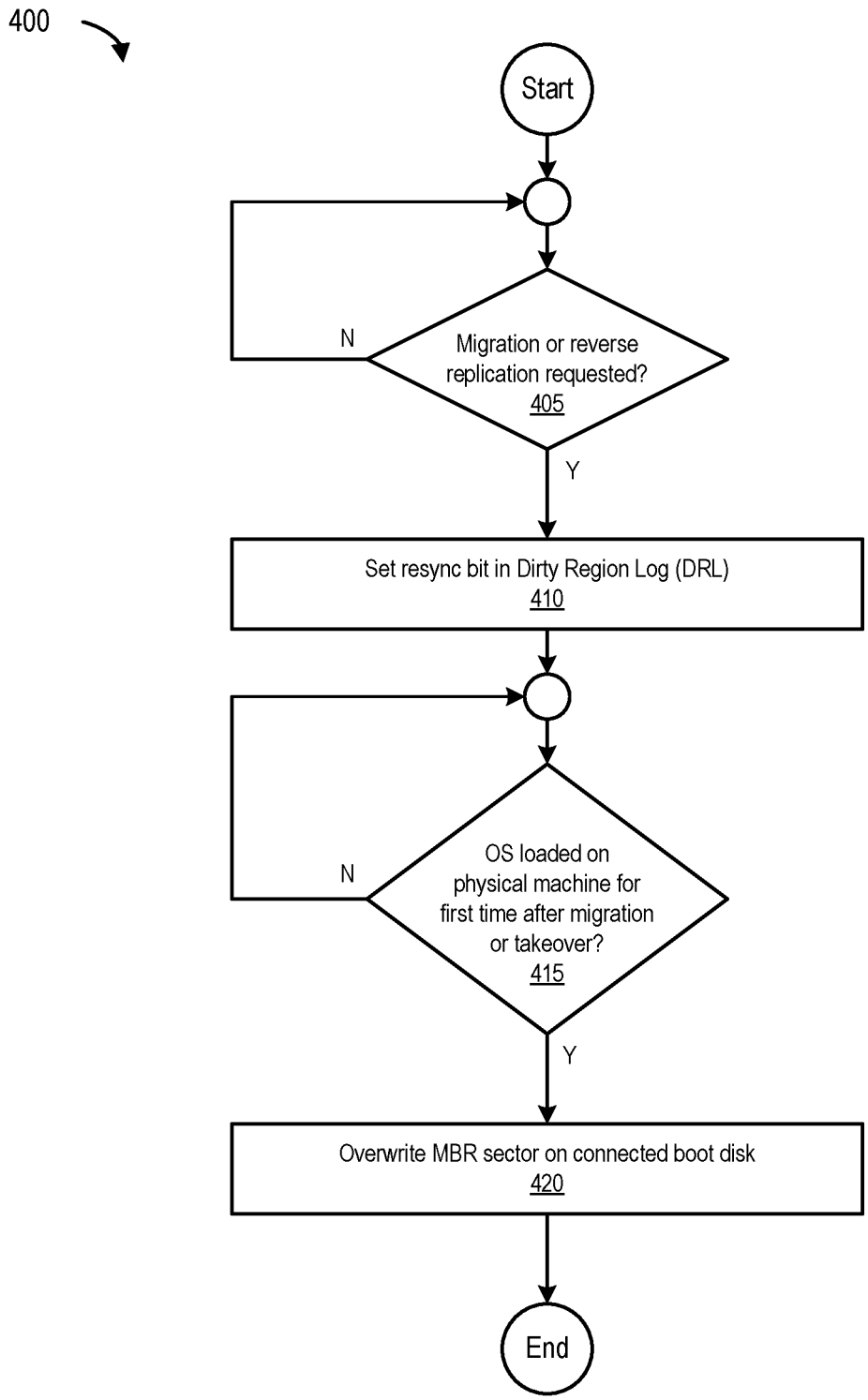
FIG. 4 is a flowchart 400 of a process for maintain data consistency during reverse replication, according to one embodiment of the present disclosure.

FIG. 4 is a flowchart 400 of a process for maintain data consistency during reverse replication, according to one embodiment. The process begins at 405 by determining whether a migration operation or a reverse replication operation is requested. If neither migration nor reverse replication is requested, the process loops to 405. However, if migration or reverse replication is requested, the process, at 410, sets a resynchronization bit (e.g., a flag, a marker, an identifier, and the like) in a DRL (e.g., DRL 120, a bitmap, and the like).

At 415, the process determines whether an OS is being loaded on (the) physical machine for the first time after migration or takeover. If the OS is not being loaded for the first time on the physical machine after migration or takeover, the process loops to 415. However, if the OS is being loaded for the first time on the physical machine after migration or takeover, the process ends at 420, by overwriting (e.g., nullifying or deleting) the MBR sector on the connected boot disk (e.g., after first copying the MBR information for later restoration).

Figure 5:
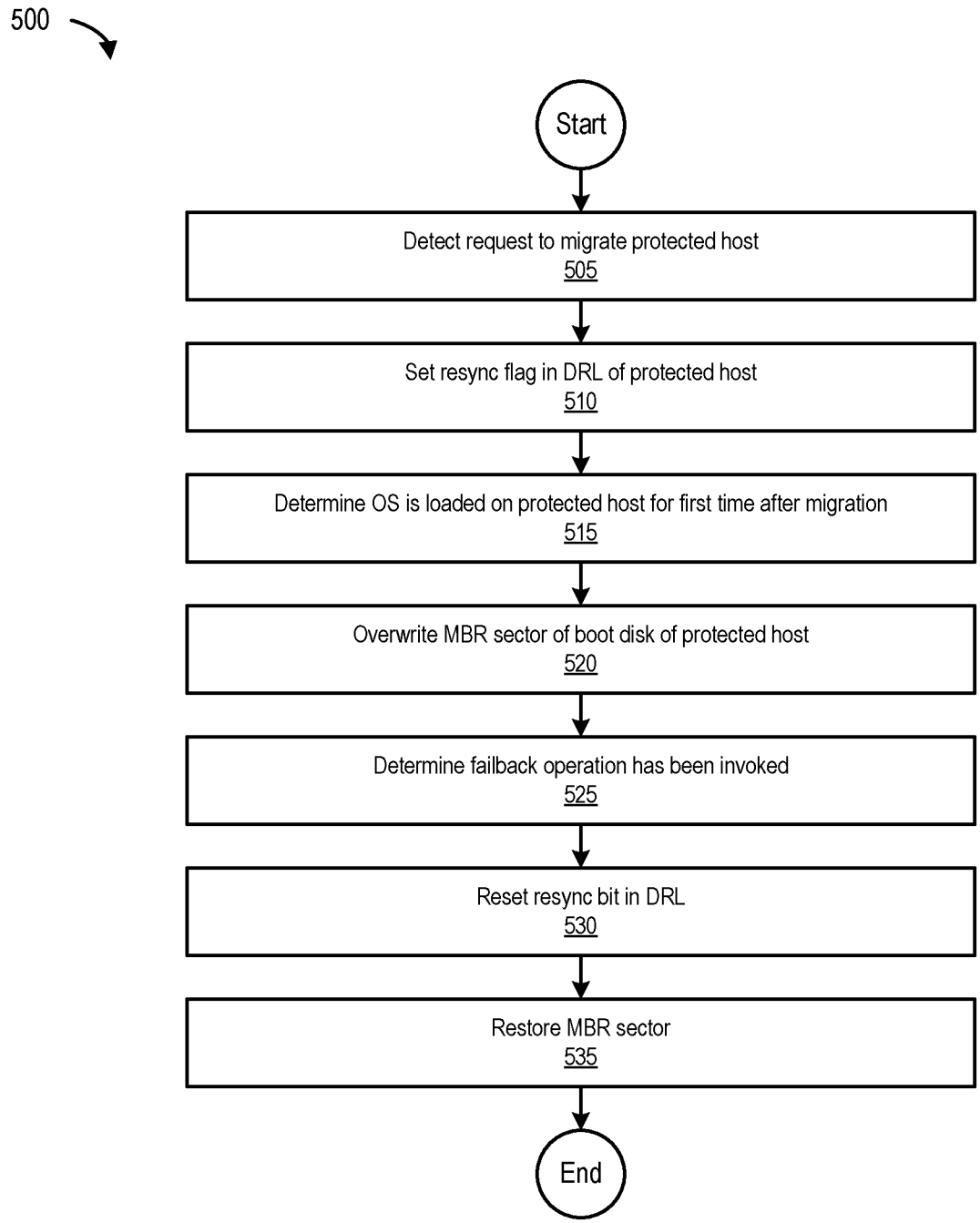
FIG. 5 is a flowchart 500 of a process for performing a failback operation, according to one embodiment of the present disclosure.

FIG. 5 is a flowchart 500 of a process for performing a failback operation, according to one embodiment. The process begins at 505 by receiving a request to migrate a protected host (e.g., a physical machine or a virtual machine with no hypervisor access). At 510, the process sets a resynchronization flag in a DRL of the protected host, and at 515, determines that an OS is loaded on the protected host for the first time after the migration. At 520, the process overwrites the MBR sector of the boot disk of the protected host. At 525, the process determines that a failback operation has been invoked (e.g., after reverse replication has been performed and is complete). At 530, the process resets the resynchronization bit in the DRL and ends at 535 by restoring the MBR sector.

Figure 6:
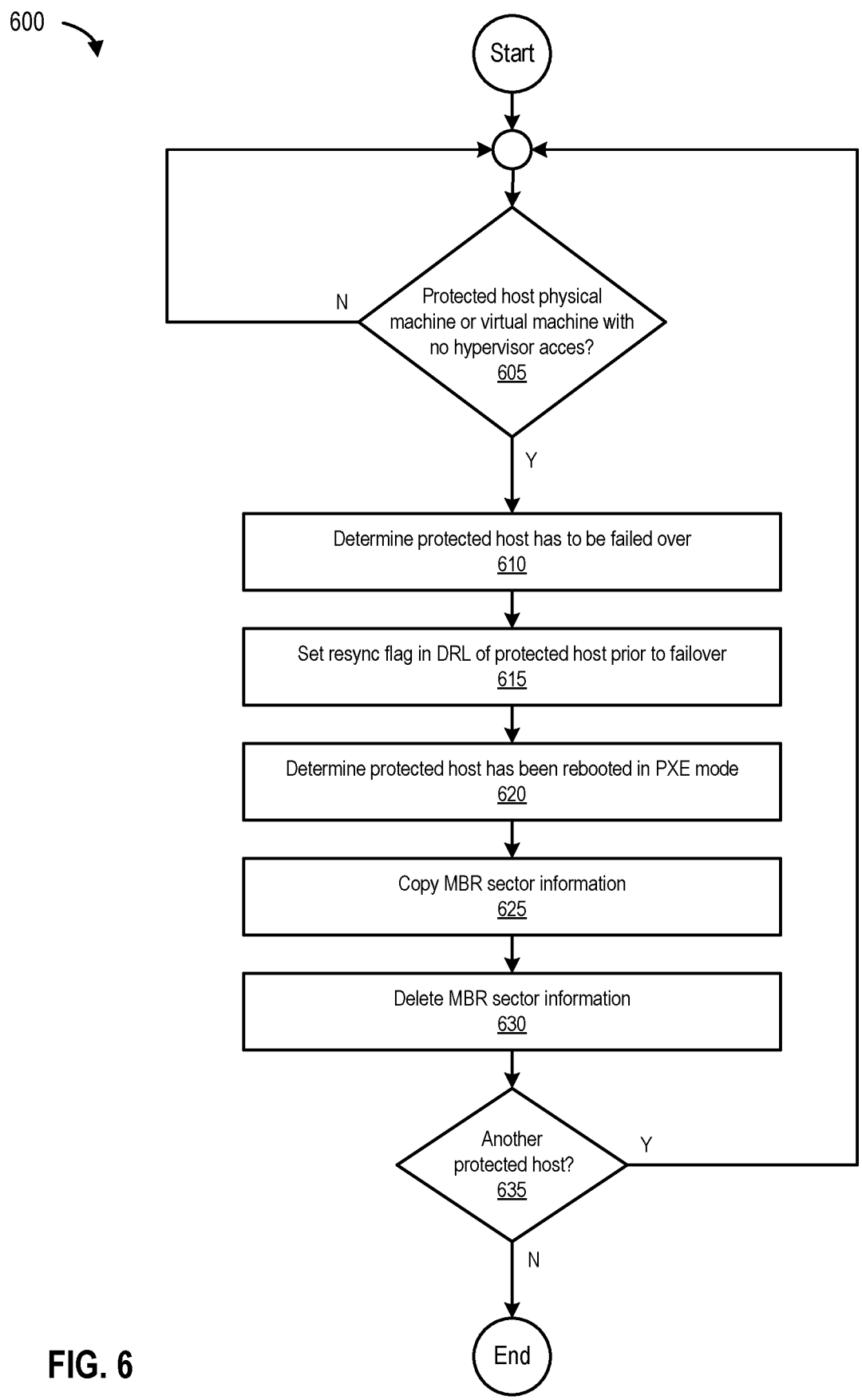
FIG. 6 is flowchart 600 of a process for overwriting a MBR sector in response to an operation request, according to one embodiment of the present disclosure.

FIG. 6 is flowchart 600 of a process for overwriting a MBR sector in response to an operation request, according to one embodiment. The process begins at 605 by determining whether a protected host is a physical machine or a virtual machine with no hypervisor access. If the protected host is not a physical machine or a virtual machine with no hypervisor access, the process loops to 405. However, if the protected host is a physical machine or a virtual machine with no hypervisor access, the process, at 610, determines that the protected host has to be failed over (e.g., because of migration or takeover).

At 615, the process sets a resynchronization flag (also called a DRL flag) in a DRL of the protected host prior to failover (e.g., if the failover is because of migration and not takeover). At 620, the process determines that the protected host been rebooted in PXE mode (e.g., for network booting). At 625, the process copies MBR sector information of the boot disk (e.g., to a memory of the premise data mover or to premise storage 145) and at 630, deletes the MBR sector information. At 635, the process determines if there is another protected host. If there is another protected host, the process loops to 605. Otherwise, the process ends.

Figure 7:
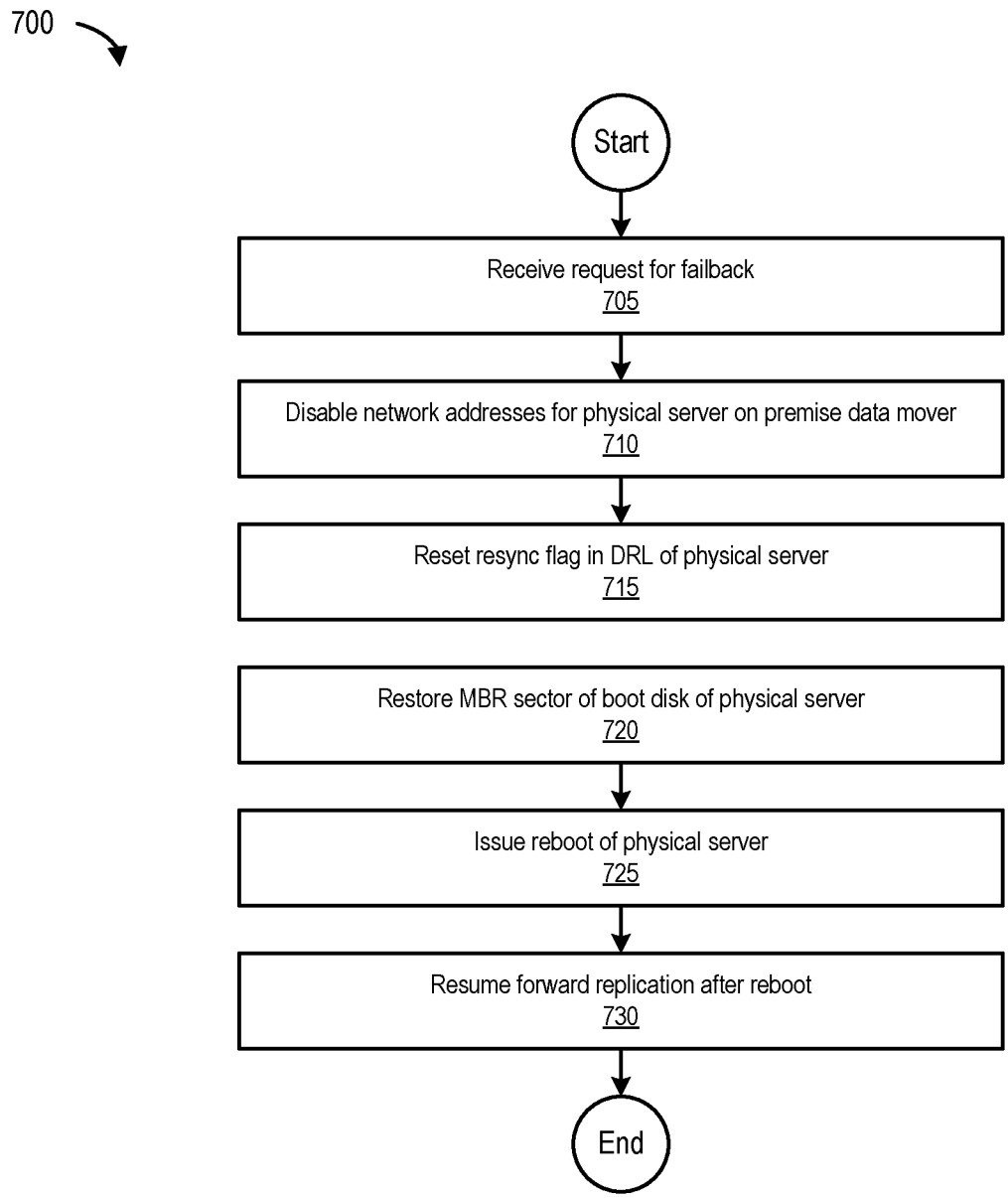
FIG. 7 is a flowchart 700 of a process for resuming forward replication, according to one embodiment of the present disclosure.

FIG. 7 is a flowchart 700 of a process for resuming forward replication, according to one embodiment. The process begins at 705 by receiving a request for a failback operation. At 710, the process disables network addresses (e.g., Media Access Control (MAC) entries) for the physical server on the premise data mover. At 715, the process resets the resynchronization flag in the DRL of the physical server, and at 720, restores the MBR sector of the boot disk of the physical server (e.g., from the MBR information that is copied prior to being overwriting). At 725, the process issues a reboot of the physical server and ends at 730 by resuming forward replication after the reboot.

It will be appreciated that the methods, systems, and processes described herein provide and maintain data consistency between cloud and on premise data while performing reverse replication for physical machines and virtual machines without hypervisor access in DRaaS computing environments.

It should be noted that U.S. provisional patent application titled "Resilient Information Technology Platform Management Across Heterogeneous Systems" with Ser. No. 62/454,871, and filed on Feb. 5, 2017, is incorporated by reference herein.

Example Computing Environment

Figure 8:
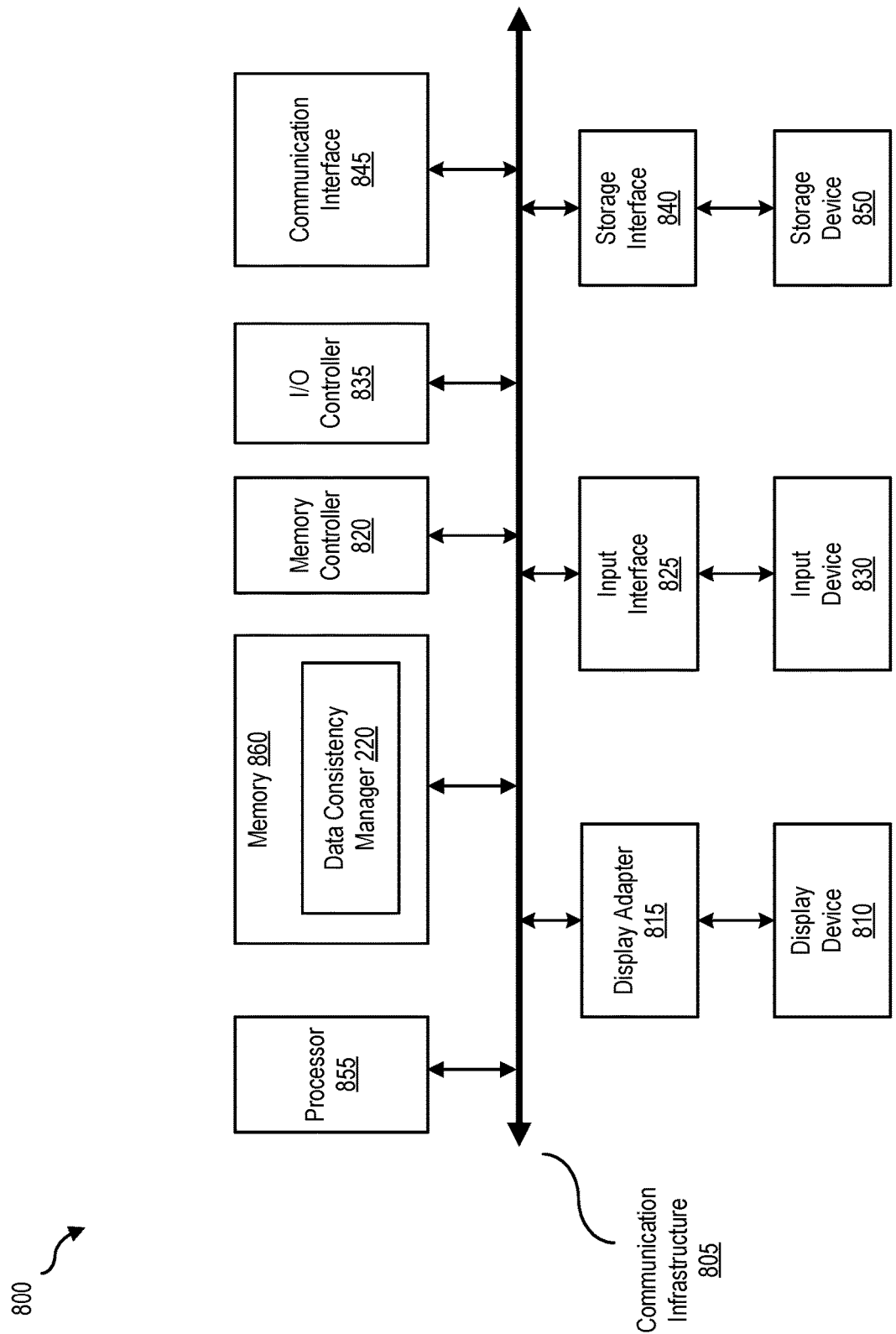
FIG. 8 is a block diagram 800 of a data consistency computing system, according to one embodiment of the present disclosure.

FIG. 8 is a block diagram of a computing system 800, according to one embodiment of the present disclosure. Computing system 800 can include premise computing device 150 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes data consistency manager 220, computing system 800 becomes a special purpose computing device that is configured to provide and maintain data consistency during reverse replication.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing data consistency manager 220 may be loaded into memory 860.

Computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtual machine and/or a physical computing device. I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815 (e.g., in a GUI). Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in storage device 850. When executed by processor 855, a computer program loaded into computing system 800 may cause processor 855 to perform and/or be a means for performing the functions of one or more of the embodiments described herein. Alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
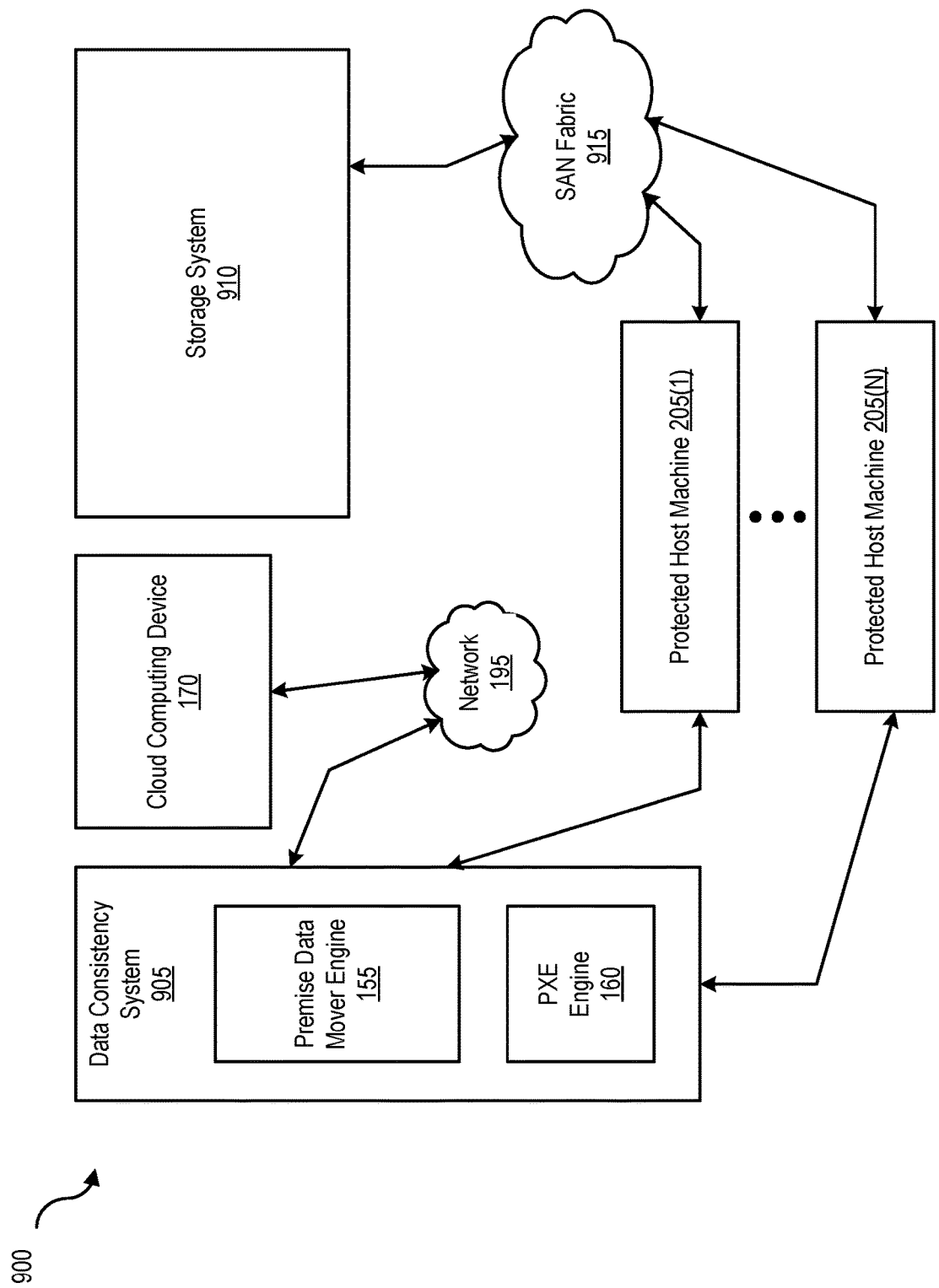
FIG. 9 is a block diagram 900 of a networked system, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with computing device 105, premise computing device 150, cloud computing device 170, and/or data consistency system 905 using Network File System (NFS), Server Message Block (SMB), or Common Internet File System (CIFS). Network 195 generally represents any type or form of computer network or architecture capable of facilitating communication between premise computing device 150 and cloud computing device 170.

In certain embodiments, a communication interface, such as communication interface 845 in FIG. 8, may be used to provide connectivity between computing device 105, premise computing device 150, cloud computing device 170, and/or data consistency system 905, and network 195. The embodiments described and/or illustrated herein are not limited to the Internet or any particular network-based environment. In some embodiments, network 195 can be a Storage Area Network (SAN). In other embodiments, data consistency manager 220 may be part of premise computing device 150, or may be separate. If separate, data consistency manager 200 may be implemented in data consistency system 905, which may be communicatively coupled to premise computing device 150 via a network (e.g., a LAN).

In one embodiment, all or a portion of one or more of the disclosed embodiments may be encoded as a computer program and loaded onto and executed by premise computing device 150. All or a portion of one or more of the embodiments disclosed herein may also be encoded as a computer program, stored on storage system 910, and distributed over network 195.

In some examples, all or a portion of cloud computing device 170 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, data consistency manager 220 may transform the behavior of premise computing device 150 to provide and maintain data consistency during reverse replication.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   determining that an operation has been requested, wherein the operation is one of a migrate operation or a reverse replication operation;
   upon determining that the migrate operation or the reverse replication operation has been requested, setting a resynchronization identifier in a dirty region log (DRL), wherein
      the DRL is associated with a computing device that is subject to the migrate operation or the reverse replication operation,
      the computing device is at a primary site;
   determining whether the computing device is booting up while a resynchronization operation is ongoing based, at least in part, on the resynchronization identifier; and
   in response to a determination that the computing device is booting up while the resynchronization operation is ongoing, overwriting a master boot record (MBR) sector of a boot disk associated with the computing device.

2. The computer-implemented method of claim 1, further comprising: determining that a failback operation has been requested; and upon determining that the failback operation has been requested, resetting a resynchronization flag on the DRL and restoring the MBR sector on the boot disk.

3. The computer-implemented method of claim 1, wherein
   the computing device is one of a physical computing device or a virtual machine that does not have access to a hypervisor.

4. The computer-implemented method of claim 1, wherein
   setting the resynchronization identifier permits a filter driver executing on the computing device to identify whether the computing device is booting up while a resynchronization operation is ongoing, and
   if the resynchronization operation is ongoing, the filter driver blocks one or more input/output (I/O) operations executed by one or more applications executing on the computing device and resets an operating system (OS) of the computing device.

5. The computer-implemented method of claim 1, wherein
   overwriting the MBR sector inhibits the computing device from booting using a boot volume even if the computing device can be booted using an operating system (OS) provided by a preboot execution environment (PXE) server.

6. The computer-implemented method of claim 1, wherein
   the setting the resynchronization identifier and the overwriting the MBR sector is performed by a premise data mover,
   the premise data mover is communicatively coupled to the computing device, and
   the premise data mover is communicatively coupled to a cloud data mover via a network.

7. The computer-implemented method of claim 1, further comprising:
   as part of the reverse replication operation, writing replicated data, received from the cloud data mover, to a storage device comprising one or more protected disks associated with the computing device.

8. A non-transitory computer readable storage medium comprising program instructions executable to:
   determine that an operation has been requested, wherein the operation is one of a migrate operation or a reverse replication operation;
   upon determining that the migrate operation or the reverse replication operation has been requested, set a resynchronization identifier in a dirty region log (DRL), wherein
      the DRL is associated with a computing device that is subject to the migrate operation or the reverse replication operation,
      the computing device is at a primary site;
   determine whether the computing device is booting up while a resynchronization operation is ongoing based, at least in part, on the resynchronization identifier; and
   in response to a determination that the computing device is booting up while the resynchronization operation is ongoing, overwrite a master boot record (MBR) sector of a boot disk associated with the computing device.

9. The non-transitory computer readable storage medium at claim 8, further comprising: determining that a failback operation has been requested; and upon determining that the failback operation has been requested, resetting a resynchronization flag on the DRL and restoring the MBR sector on the boot disk.

10. The non-transitory computer readable storage medium of claim 8, wherein
   the computing device is one of a physical computing device or a virtual machine that does not have access to a hypervisor.

11. The non-transitory computer readable storage medium of claim 8, wherein
setting the resynchronization identifier permits a filter driver executing on the computing device to identify whether the computing device is booting up while a resynchronization operation is ongoing, and
if the resynchronization operation is ongoing, the filter driver blocks one or more input/output (I/O) operations executed by one or more applications executing on the computing device and resets an operating system (OS) of the computing device.

12. The non-transitory computer readable storage medium of claim 8, wherein
overwriting the MBR sector inhibits the computing device from booting using a boot volume even if the computing device can be booted using an operating system (OS) provided by a preboot execution environment (PXE) server.

13. The non-transitory computer readable storage medium of claim 8, wherein
the setting the resynchronization identifier and the overwriting the MBR sector is performed by a premise data mover,
the premise data mover is communicatively coupled to the computing device, and
the premise data mover is communicatively coupled to a cloud data mover via a network.

14. The non-transitory computer readable storage medium of claim 8, further comprising:
as part of the reverse replication operation, writing replicated data, received from the cloud data mover, to a storage device comprising one or more protected disks associated with the computing device.

15. A system comprising:
one or more processors; and
a memory coupled to the one or more processors, wherein the memory stores program instructions executable by the one or more processors to:
determine that an operation has been requested, wherein the operation is one of a migrate operation or a reverse replication operation;
upon determining that the migrate operation or the reverse replication operation has been requested, set a resynchronization identifier in a dirty region log (DRL), wherein
the DRL is associated with a computing device that is subject to the migrate operation or the reverse replication operation,
the computing device is at a primary site;
determine whether the computing device is booting up while a resynchronization operation is ongoing based, at least in part, on the resynchronization identifier; and
in response to a determination that the computing device is booting up while the resynchronization operation is ongoing, overwrite a master boot record (MBR) sector of a boot disk associated with the computing device.

16. The system of claim 15, further comprising: determining that a failback operation has been requested; and upon determining that the failback operation has been requested, resetting a resynchronization flag on the DRL and restoring the MBR sector on the boot disk.

17. The system of claim 15, wherein
the computing device is one of a physical computing device or a virtual machine that does not have access to a hypervisor.

18. The system of claim 15, wherein
setting the resynchronization identifier permits a filter driver executing on the computing device to identify whether the computing device is booting up while a resynchronization operation is ongoing, and
if the resynchronization operation is ongoing, the filter driver blocks one or more input/output (I/O) operations executed by one or more applications executing on the computing device and resets an operating system (OS) of the computing device.

19. The system of claim 15, wherein
overwriting the MBR sector inhibits the computing device from booting using a boot volume even if the computing device can be booted using an operating system (OS) provided by a preboot execution environment (PXE) server,
the setting the resynchronization identifier and the overwriting the MBR sector is performed by a premise data mover,
the premise data mover is communicatively coupled to the computing device, and
the premise data mover is communicatively coupled to a cloud data mover via a network.

20. The system of claim 19, further comprising:
as part of the reverse replication operation, writing replicated data received from the cloud data mover to a storage device comprising one or more protected disks associated with the computing device.

* * * * *